(12) United States Patent
Kenthapadi et al.

(10) Patent No.: US 11,195,149 B2
(45) Date of Patent: Dec. 7, 2021

(54) RELATING DATA WHILE PREVENTING INTER-ENTITY DATA SHARING

(71) Applicant: Microsoft Technology Licensing, LLC, Redmond, WA (US)

(72) Inventors: Krishnaram Kenthapadi, Sunnyvale, CA (US); Ryan Wade Sandler, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1351 days.

(21) Appl. No.: 15/169,487

(22) Filed: May 31, 2016

(65) Prior Publication Data

US 2017/0344952 A1 Nov. 30, 2017

(51) Int. Cl.
*G06Q 10/10* (2012.01)
*G06F 21/60* (2013.01)
*G06F 16/2457* (2019.01)
*G06F 21/62* (2013.01)

(52) U.S. Cl.
CPC ..... *G06Q 10/105* (2013.01); *G06F 16/24578* (2019.01); *G06F 21/602* (2013.01); *G06F 21/6245* (2013.01)

(58) Field of Classification Search
CPC ............ G06Q 10/105; G06F 16/24578; G06F 21/602; G06F 21/6245
USPC .......................................................... 705/50
See application file for complete search history.

(56) References Cited

U.S. PATENT DOCUMENTS

| | | | |
|---|---|---|---|
| 9,152,716 B1 * | 10/2015 | Triandopoulos ..... | G06F 16/9535 |
| 2005/0261953 A1 * | 11/2005 | Malek ................. | G06Q 30/0201 |
| | | | 705/7.32 |
| 2011/0137975 A1 * | 6/2011 | Das ..................... | G06Q 30/0269 |
| | | | 709/203 |
| 2014/0059175 A1 * | 2/2014 | Isaac ..................... | G06Q 40/00 |
| | | | 709/217 |
| 2016/0012395 A1 * | 1/2016 | Omar ................... | G06Q 10/105 |
| | | | 705/320 |

* cited by examiner

*Primary Examiner* — John W Hayes
*Assistant Examiner* — Wodajo Getachew
(74) *Attorney, Agent, or Firm* — Schwegman Lundberg & Woessner, P.A.

(57) ABSTRACT

Aspects of the present disclosure relate to cryptography. In particular, example embodiments relate to computing a relationship between private data of a first entity and private data of a second entity, while preserving privacy of the entities and preventing inter-entity data sharing. A server includes a first component to compute an intersection of two datasets, without directly accessing either dataset. The server includes a second component to compute a relationship, such as a regression, between data in the first dataset and data in the second dataset, without directly accessing either dataset.

18 Claims, 7 Drawing Sheets

RELATING DATA WHILE PREVENTING INTER-ENTITY DATA SHARING

TECHNICAL FIELD

The subject matter disclosed herein relates to cryptography. In particular, example embodiments may relate to computing a relationship between features of members stored by a first data storage entity and numerical data of members stored by a second data storage entity, while preserving privacy and preventing inter-entity data sharing between the first data storage entity and the second data storage entity.

BACKGROUND

Payroll providers store salary data of members, and professional networking services store features of members, which may be used to predict their salaries. Correlating the features of the members with their salaries may be interesting and may provide valuable insights. However, the professional networking service and the payroll provider may be reluctant to share data with one another. As the foregoing illustrates, techniques may be desirable for computing a relationship between features of members stored by a professional networking service and salaries of members stored by a payroll provider, while preserving privacy and preventing inter-entity data sharing between the professional networking service and the payroll provider.

SUMMARY

In one aspect, the disclosed subject matter can be embodied in a method. The method includes determining, at a server, a representation of an intersection of a member list of a professional networking service and a member list of a payroll provider, without accessing the member list of the professional networking service or the member list of the payroll provider. The method includes causing, at the server, computation, using information associated with the intersection of the member list of the professional networking service and the member list of the payroll provider, of coefficients of a numeric relationship between features of members stored by the professional networking service and numeric data of members stored by the payroll provider, without accessing the features and the numeric data at the server. The numeric data includes a salary. The method includes providing a digital transmission representing the coefficients of the numeric relationship.

In one aspect, the disclosed subject matter can be embodied in a non-transitory machine-readable medium including instructions. The instructions include code for determining a representation of an intersection of a member list of a professional networking service and a member list of a payroll provider, without accessing the member list of the professional networking service or the member list of the payroll provider. The instructions include code for causing computation, using information associated with the intersection of the member list of the professional networking service and the member list of the payroll provider, of coefficients of a numeric relationship between features of members stored by the professional networking service and numeric data of members stored by the payroll provider, without accessing the features and the numeric data at the machine. The numeric data includes a salary. The instructions include code for providing a digital transmission representing the coefficients of the numeric relationship.

In one aspect, the disclosed subject matter can be embodied in a server. The server includes one or more processors and a memory. The memory stores instructions for execution by the one or more processors. The instructions include code for determining, at the server, a representation of an intersection of a member list of a professional networking service and a member list of a payroll provider, without accessing the member list of the professional networking service or the member list of the payroll provider. The instructions include code for causing, at the server, computation, using information associated with the intersection of the member list of the professional networking service and the member list of the payroll provider, of coefficients of a numeric relationship between features of members stored by the professional networking service and numeric data of members stored by the payroll provider, without accessing the features and the numeric data at the server. The numeric data includes a salary. The instructions include code for providing a digital transmission representing the coefficients of the numeric relationship.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
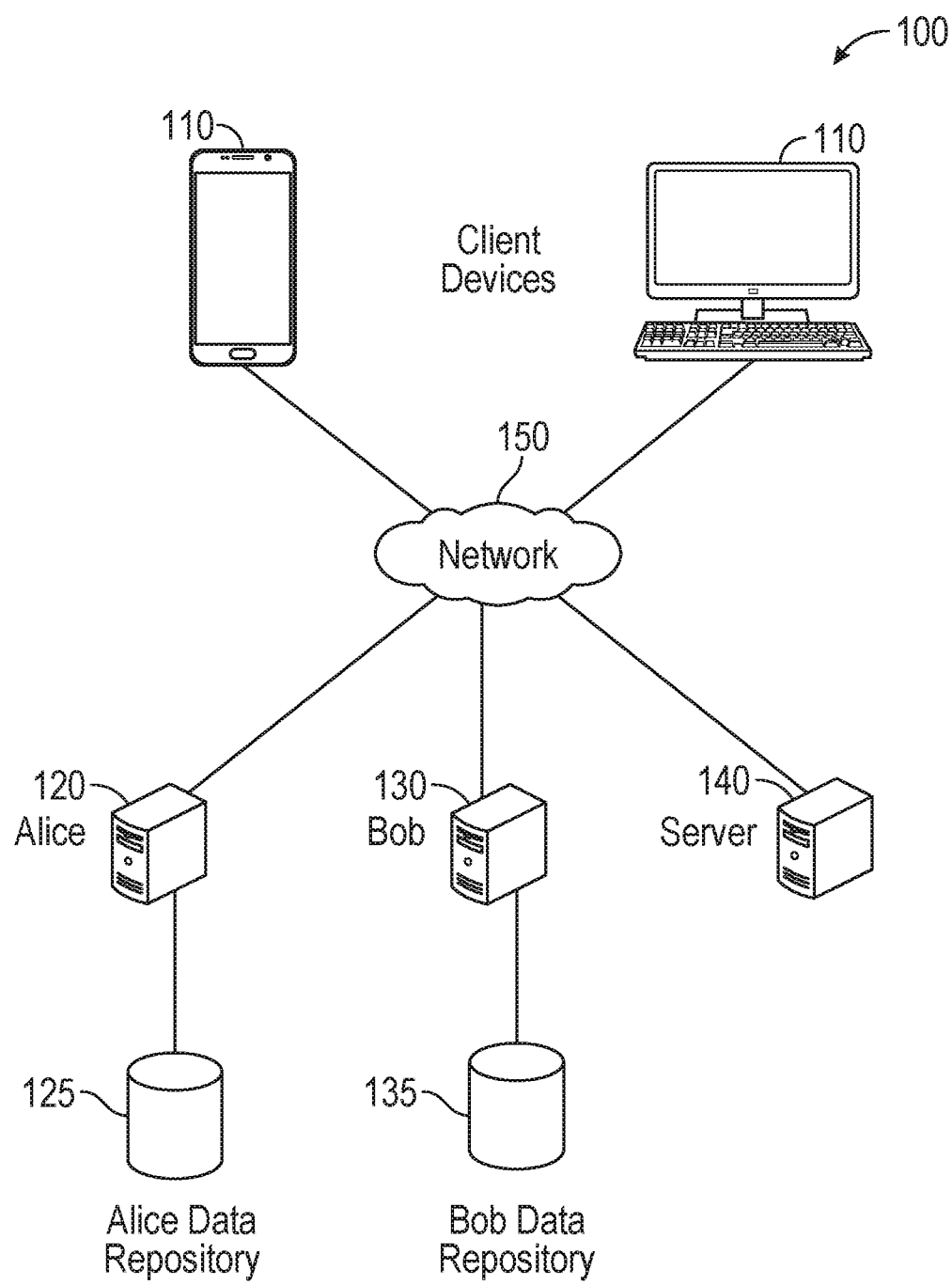
FIG. 1 is a diagram of an example system in which relating private data of different entities may be implemented.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above techniques may be desirable for computing a relationship between private data of a first entity and private data of a second entity, while preserving privacy of the entities and preventing inter-entity data sharing beyond the coefficients of the computed relationship. The entities may include companies that have customers or users. The companies may not wish to share the data of their customers or users to protect the privacy of the customers or users, and to protect themselves from liability for breaches of data stored on machines that they do not control (e.g., machines controlled by the other entity). Some aspects of the subject technology provide techniques for computing such relationships.

According to one implementation, each of two entities has data about members. For example, a high school has data about its students, and an examination company has test scores of test takers. Some of the students are test takers, while other students are not test takers. Similarly, some of the test takers are students at the high school and other test takers are not (e.g., other test takers attend other high schools or do not attend high school). The high school stores the identity numbers (e.g., social security numbers) of its students, and the examination company stores the identity numbers of the test takers. However, the high school cannot release the identity numbers of its students to machines outside the high school, and the examination company cannot release the identity numbers of its test takers to machines outside the examination company, for example, due to concerns about privacy and liability if the data is breached.

The high school and the examination company may be interested in how grades in the high school (e.g., average grade, represented as a number, in English, average grade in math, average grade in science, and average grade in history) relate to test scores. In other words, the high school and the examination company may wish to determine the structure and coefficients of an equation $b=f(M)$, where b a vector of test scores (one score per member), and M is a matrix of member features known to the high school, with rows representing members and columns representing features, such as average grades in English, math, science, and history courses, respectively. The equation $b=f(M)$ may include one of a linear equation, a quadratic equation, a cubic equation, a logarithmic equation, an exponential equation, and the like.

In order to do this, the high school and the examination company determine a list (or other data structure) of common members who are both students of the high school and test takers of the examination company. After determining the list of common members, the high school and the examination company apply regression analysis to determine the structure and coefficients of the equation $b=f(M)$. In an ideal world, the high school and the examination company would both reveal their data to a trusted third party, which would be able to compute the list of common members and the regression. However, in many cases, no such trusted third party exists and both the high school and the examination company are unwilling to release their data outside of their respective computer systems.

To compute the list of common members, the high school and the examination company agree on a member identifier ui (e.g., identity number, such as social security number) that they both have in common. The high school and the examination company agree on a one-way hash function h(ui) that is computationally impossible (e.g., prohibitively expensive or not feasible using available computers) to invert. The high school and the examination company compute the one-way hash function of each member identifier in their respective sets of members and reveal the computed values to a third party. For example if the high school has students/member identifiers u1, u2, u3, and u4, and the examination company has test takers/member identifiers u3, u4, u5, and u6, the high school reveals to the third party h(u1), h(u2), h(u3), and h(u4), and the examination company reveals to the third party h(u3), h(u4), h(u5), and h(u6). The third party then computes the intersection of the two lists that were revealed—h(u3), and h(u4)—and provides this intersection to the high school and the examination company. Based on the provided intersection, the high school and the examination company determine their common members u3 and u4.

Upon completion of the above, the high school and the examination company both have access to a common set of members, call it U, which has n members. (In the simple example above, n=2. However, in some cases, n may be much larger. For instance, thousands of students in a large high school may take a college entrance exam, such as the SAT® administered by the College Board of New York, N.Y.)

F(M,b) represents a function that takes as input the private data from the high school M, and the private data from the examination company b, and outputs a set of model (e.g., regression) coefficients of the equation $b=f(M)$. The equation $b=f(M)$ is encoded, at a third party or at a machine of the high school or the examination company, as a Boolean circuit, as described in greater detail below. After encoding, the high school hard codes the features of M into the function F(M,b), resulting in a Boolean circuit for F'(b), which is a function of b and not of M. The high school garbles the Boolean circuit with pseudorandom (e.g., using a computerized random number generator) keys K, with a different key representing an input of 0 or 1 for each input wire of the Boolean circuit. The high school provides the Boolean circuit the keys K that are used for each wire of the Boolean circuit to the examination company, without specifying whether the keys represent 0 or 1. The examination company then computes the coefficients from F'(b) using the provided keys K, and provides the computed coefficients to the high school or the third party. The equation $b=f(M)$ can now be written using the computed coefficients.

According to some examples, a professional networking service and a payroll provider wish to collaborate to determine a numeric relationship between features of members stored by the professional networking service and numeric data (e.g., an hourly, weekly, monthly, or yearly salary or other compensation data) of members stored by the payroll provider. The numeric data may include any compensation data, including but not limited to base salary, different types of additional compensation, total compensation, quantification of the monetary value associated with health and other benefits, and the like. A server (which may belong to the professional networking service, the payroll provider, or a third party) determines an intersection of a member list of the professional networking service and a member list of the payroll provider, without accessing the member list of the professional networking service or the member list of the payroll provider. The server causes computation, using information associated with the intersection of the member list of the professional networking service and the member list of the payroll provider, of coefficients of a numeric relationship (e.g., regression) between features of members stored by the professional networking service and numeric data of members stored by the payroll provider. The server provides a digital transmission representing the coefficients of the numeric relationship.

The member list of the professional networking service may include members identified by one or more of a last name, a first name, a company name, and an office location.

Similarly, the member list of the payroll provider may include members identified by one or more of a last name, a first name, a company name, and an office location. The office location may be a street address (e.g., 123 Main Street, City, State, and Zip) or a tax jurisdiction (e.g., Pennsylvania).

The features of members stored by the professional networking service, which may be used to determine the numeric relationship, may include one or more of a ranking of an educational institution, a ranking of an educational degree, a number of years of professional experience, a ranking of a quality of the professional experience, a ranking of one or more professional skills, a current position title, a past position title, a seniority level of the current or the past position title, a current employer, a past employer, a publication or patent held by the member, or a project completed by the member. The ranking of the educational institution may correspond to a ranking of the educational institution by a journal that ranks educational institutions (e.g., US News and World Report college rankings). The ranking of the educational degree may be based on a number of years of post-high school typically required to obtain the educational degree (e.g., a law degree requires seven years; three years of law school and four years of college). The ranking of the quality of the professional experience may account for the fact that employees with some types of professional experience can command higher salaries than others. For example, an attorney who has five years of experience at a large, international law firm in New York City can likely command a higher salary than an attorney who has five years of experience at a family law and trusts/estates practice in rural Texas. The ranking of professional skills can be based on endorsements and self-provided lists of professional skills within the professional networking service. For example, an attorney who is a good public speaker can likely command a higher salary than an attorney who lacks this skill.

Implementations of the subject technology may be useful in the real world. For example, using the techniques of the subject technology, a member of the professional networking service who is contemplating renegotiating his/her salary or seeking a career change may use the generated numeric relationship in order to predict how his/her salary is likely to be effected by various career moves and/or to determine how his/her salary compares with salaries of similar professionals. Furthermore, a member of the professional networking service choosing an educational institution, a field of study, or other educational or professional program can use the numeric relationship provided by the subject technology to predict what his/her salary range would be if he/she undergoes the educational or professional program.

FIG. 1 is a diagram of an example system 100 in which relating private data of different entities may be implemented. As shown, the system 100 includes client devices 110, a machine of a first entity, Alice 120, a machine of a second entity, Bob 130, and a server 140 connected to a network 150. The network 150 may include one or more of the Internet, an intranet, a local area network, a wide area network (WAN), a cellular network, a WiFi network, a virtual private network (VPN), a public network, a wired network, a wireless network, and the like. Alice 120 is connected to an Alice data repository 125, which stores Alice's private data. Bob 130 is connected to a Bob data repository 135, which stores Bob's private data.

The client device(s) 110 may include one or more of a laptop computer, a desktop computer, a mobile phone, a tablet computer, a personal digital assistant (PDA), a digital music player, a smart watch, and the like. The client device(s) 110 may be used, for example, by employees of the entities associated with Alice 120 of Bob 130, to add data to the data repositories 125/135, which may be accessed, by the client device(s) 110 over the network 150, with the machines 120/130 serving as intermediaries.

Alice 120 is capable of accessing the Alice data repository 125 and ensures that the data in the Alice data repository 125 remains private. More details of the operation of Alice 120 are provided in conjunction with FIGS. 2-3.

Similarly, Bob 130 is capable of accessing the Bob data repository 135 and ensures that the data in the Bob data repository 135 remains private. More details of the operation of Bob 130 are provided in conjunction with FIGS. 2-3.

Each of the Alice data repository 125 and the Bob data repository 135 may be implemented as any type of data storage unit. According to some examples, either the Alice data repository 125 or the Bob data repository is a database.

In one example, Alice 120 is a server of a professional networking service. The Alice data repository 125 stores features of members of the professional networking service, including one or more of a ranking of an educational institution, a ranking of an educational degree, a number of years of professional experience, a ranking of a quality of the professional experience, and a ranking of one or more professional skills. The members of the professional networking service are identified by one or more of a last name, a first name, a company name, and an office location.

In one example, Bob 130 is a server of a payroll provider. The Bob data repository 135 stores salaries of members. The members of the payroll provider are identified by one or more of a last name, a first name, a company name, and an office location.

The server 140 is a third party server that is owned and trusted by neither the entity associated with Alice 120 nor the entity associated with Bob 130. In alternative implementations, the server 140 may be owned by either the entity of Alice 120 or the entity of Bob 130. As described herein, the server 140 receives encrypted data from Alice 120 and Bob 130 and does calculations with the encrypted data. More details of the operation of the server 140 are provided in conjunction with FIGS. 2-4.

In one example discussed herein, the entity associated with Alice 120 is a high school storing numeric grades of students, and the entity associated with Bob 130 is an examination company storing numeric test scores. However, the subject technology may be used in other contexts also. For instance, the entity associated with Alice 120 may be a department of motor vehicles storing driving records, and the entity associated with Bob 130 may be a credit reporting agency storing credit scores. The entity associated with Alice may be a credit card company storing spending information, and the entity associated with Bob may be an airline storing a frequent flier account balance. In sum, the subject technology may be used in any context where Alice 120 stores one dataset, Bob 130 stores another dataset, and Alice 120 and Bob 130 desire to develop a model that relates the dataset of Alice 120 to the dataset of Bob 130, while keeping their respective datasets private.

In another example discussed herein, the entity associated with Alice 120 is a professional networking service storing features of professionals, and the entity associated with Bob 130 is a payroll provider storing numeric data (e.g., hourly, weekly, monthly, or yearly salaries) of professionals. The subject technology is used to determine a numeric relationship between the features stored by the professional networking service and the salaries, without requiring the professional networking service to disclose the features or the payroll provider to disclose the numeric data.

Figure 2:
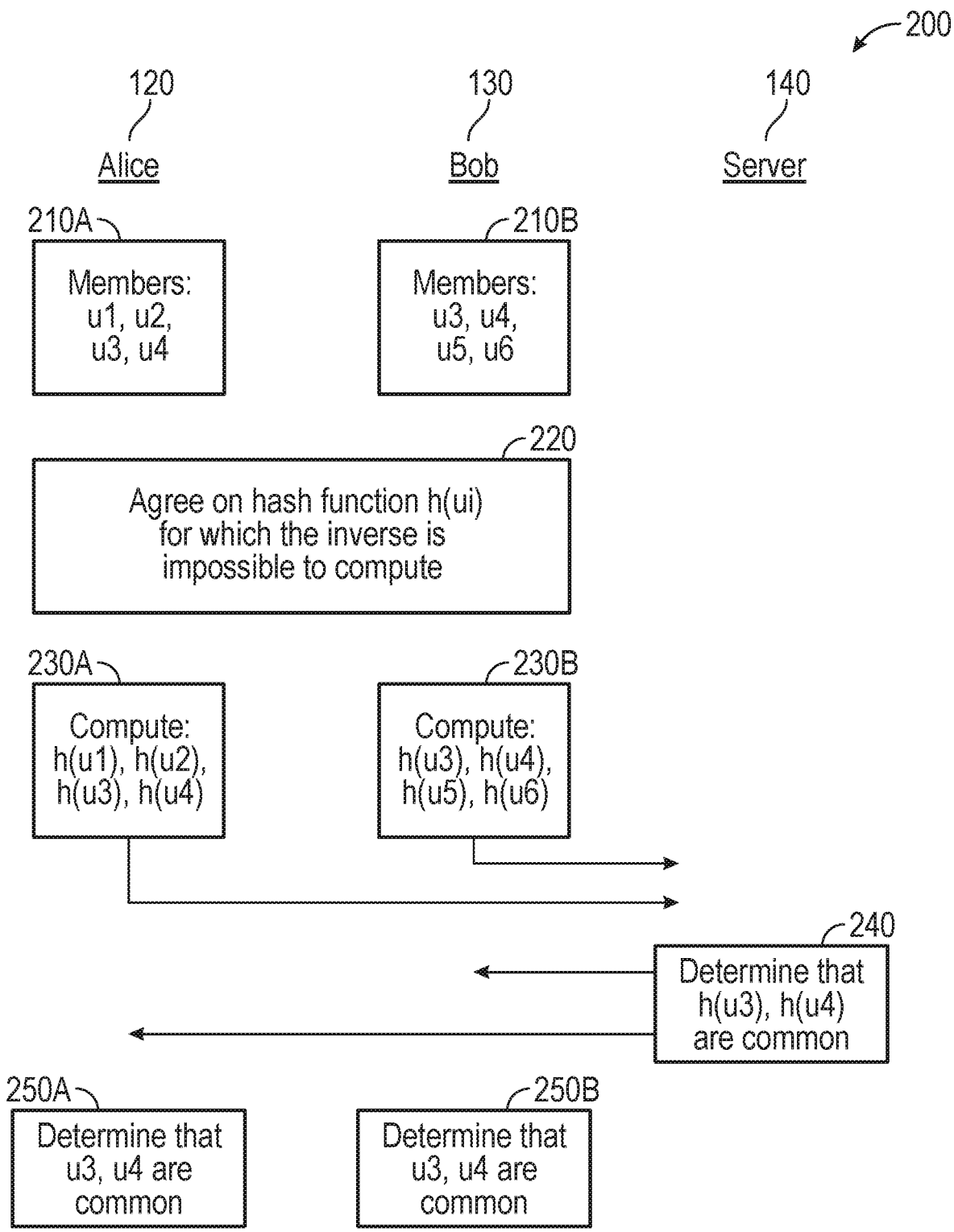
FIG. 2 is a data flow diagram of an example method of computing common members of two entities.

FIG. 2 is a data flow diagram of an example method 200 of computing common members of two entities.

The method 200 begins at blocks 210A and 210B. At block 210A, Alice 120 determines (e.g., based on data in the Alice data repository 125) that it has members with member identifiers: u1, u2, u3, and u4. At block 210B, Bob 130 determines (e.g., based on data in the Bob data repository 135) that it has members with member identifiers: u3, u4, u5, and u6. The member identifiers u1-u6 may represent any identifiers of members. For example, if Alice 120 is a high school and Bob 130 is an examination company, the values u1-u6 may include one or more of social security numbers of students/test takers, first and last names and addresses of students/test takers, identity card (e.g., driver's license) numbers of students/test takers, and the like. If Alice 120 is a professional networking service and Bob 130 is a payroll provider, the values u1-u6 may include one or more of a last name, a first name, a company name, and an office location of the users/members of the professional networking service or the payroll company. In order to preserver privacy of the users/members/students/test takers, Alice 120 and Bob 130 do not share their data with one another or with any third parties.

At block 220, Alice 120 and Bob 130 agree on a hash function h(ui) of the user identifiers. The hash function h(ui) has a one-to-one mapping of inputs (user identifier values) to outputs (hash values) and has an inverse that is impossible to compute. As used herein, the phrase "impossible to compute" encompasses its plain and ordinary meaning. In some cases, a value is said to be "impossible to compute" if it is prohibitively expensive or not feasible to compute that value using available computers. In other words, a machine knowing the hash function h(ui), and knowing that $h(\alpha)=\beta$, where $\beta$ is known and $\alpha$ is unknown, should not be able to derive $\alpha$.

At block 230A, Alice 120 computes and stores the values in Table 1, below.

TABLE 1

| Member Identifier List | Hash value List |
|---|---|
| u1 | h(u1) |
| u2 | h(u2) |
| u3 | h(u3) |
| u4 | h(u4) |

At block 230B, Bob 130 computes and stores the values in Table 2, below.

TABLE 2

| Member Identifier List | Hash value List |
|---|---|
| u3 | h(u3) |
| u4 | h(u4) |
| u5 | h(u5) |
| u6 | h(u6) |

It should be noted that the hash values h(u1)–h(u6) can safely be shared outside of the machines of Alice 120 or Bob 130 because they cannot be used to derive the private information of Alice 120 or Bob 130 (as h(ui) is impossible to invert). Furthermore, Tables 1-2 refer to a member identifier list and a hash value list. However, other data structures (e.g., arrays or matrices) can be used in place of the lists. After computing the hash value lists, Alice 120 and Bob 130 transmit the hash value lists to the server 140.

At block 240, the server 140 computes an intersection of the hash value list received from Alice 120 and the hash value list received from Bob 130. For example, the server computes the intersection by searching for each value in the hash value list from Alice 120 within the hash value list of Bob 130, and adding the hash value to intersection upon finding it in the hash value list of Bob 130. Based on the computed intersection, the server 140 determines that h(u3) and h(u4) represent common members of Alice 120 and Bob 130. The server 140 transmits, to both Alice 120 and Bob 130, the set of common hash values h(u3) and h(u4). In an alternative implementation, the functions of the server 140 may be carried out at the machine of Alice 120 or Bob 130. The server 140 may belong to Alice 120 or to Bob 130. Alternatively, the server 140 may be a third party server.

At block 250A, Alice 120 determines, based on set of common hash values h(u3) and h(u4), and the information of Table 1, that the set of common users U among Alice 120 and Bob 130 includes u3 and u4. Similarly, at block 250B, Bob 130 determines, based on set of common hash values h(u3) and h(u4), and the information of Table 2, that the set of common members U among Alice 120 and Bob 130 includes u3 and u4. After blocks 250A and 250B, the method 200 ends.

The method 200 is described here as being applied to four members of Alice 120 and four members of Bob 130 to determine two members common to Alice 120 and Bob 130. However, it should be noted that, in some implementations, the subject technology may be used with much larger data sets. For example, Alice 120 may represent a high school with 1000 students, Bob 130 may represent an examination company with 100,000 test takers, and there may be 900 members who are both students and test takers. In another example, Alice 120 represents a department of motor vehicles storing 30 million driving records, Bob 120 represents a credit reporting agency storing 20 million credit scores, and 15 million members have both a driving record and a credit score. In one more example, Alice 120 represents a professional networking service with 15 million members, Bob 130 represents a payroll provider with 20 million members, and there are 5 million common members of Alice 120 and Bob 130.

Figure 3A:
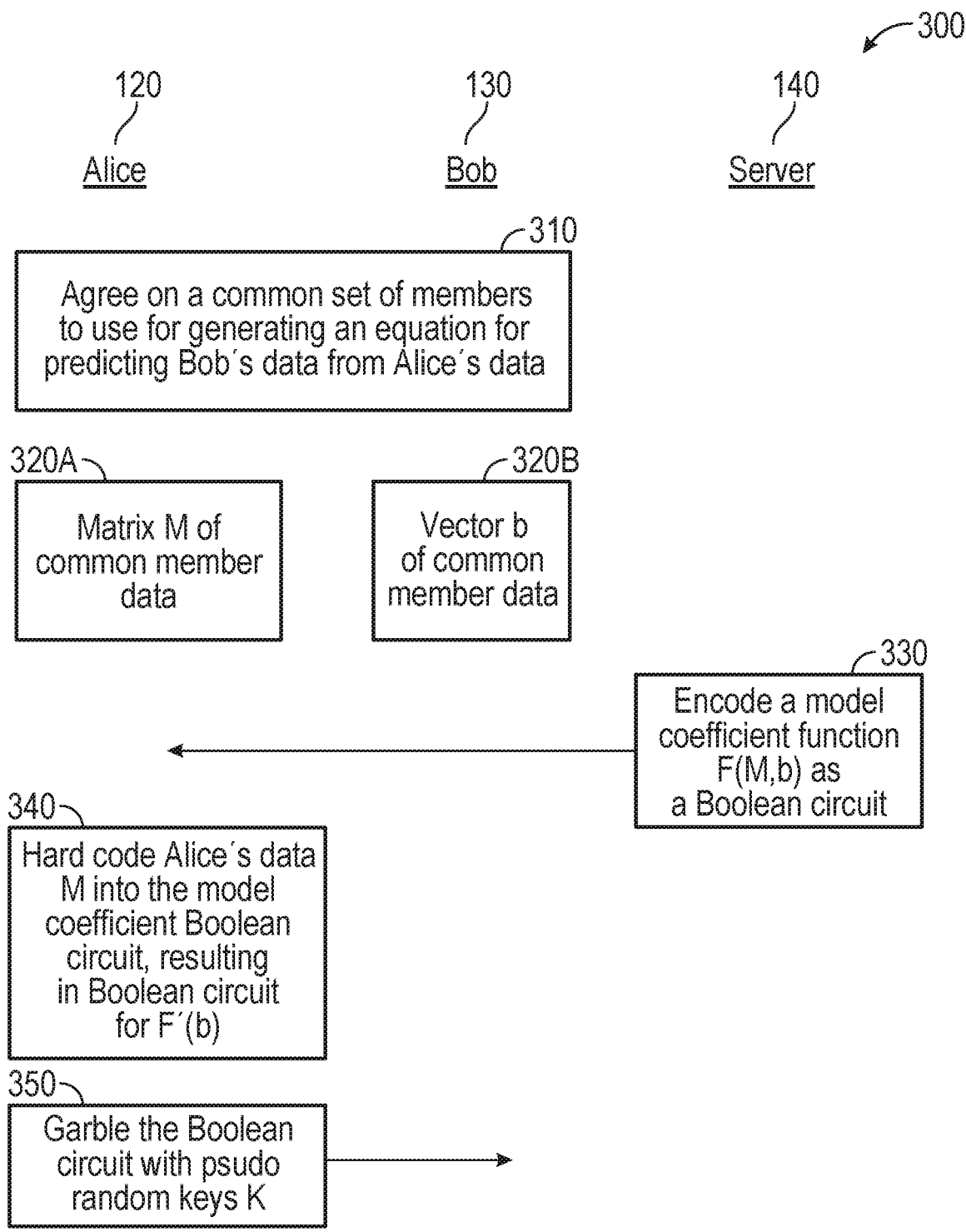
FIGS. 3A-3B are a data flow diagram of an example method of computing model coefficients for a model relating data of a first entity to data of a second entity.
Figure 3B:
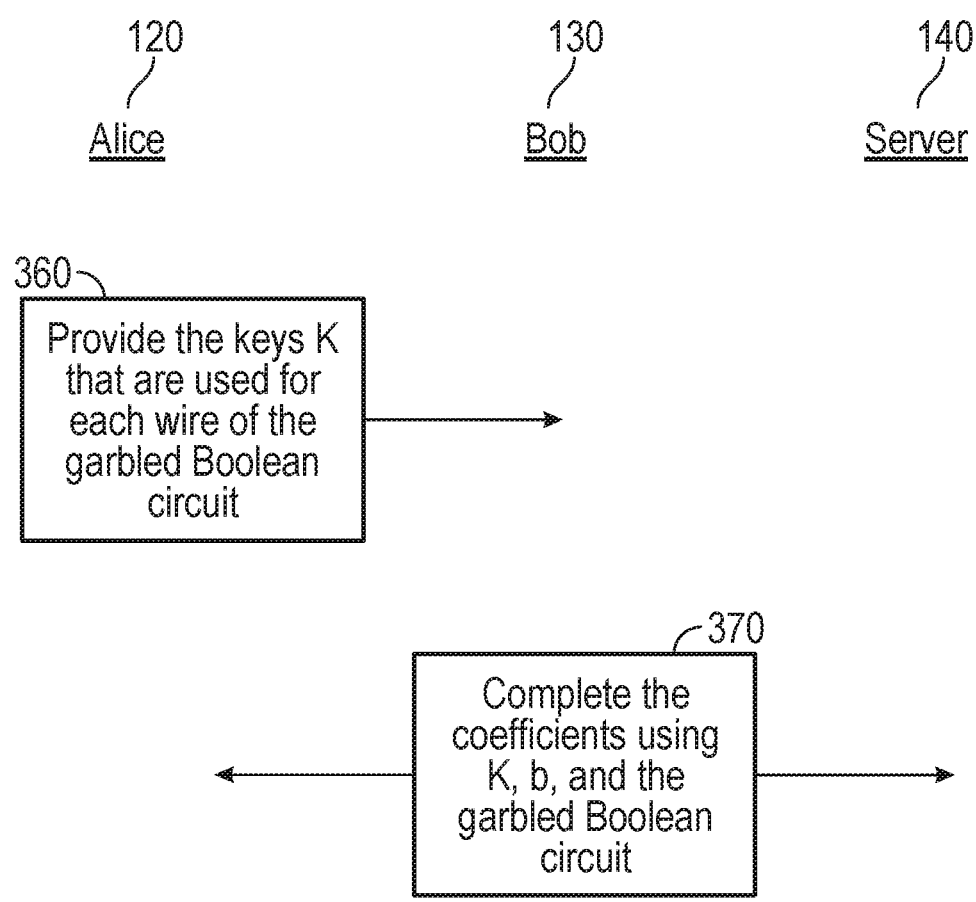

FIGS. 3A-3B are a data flow diagram of an example method 300 of computing model coefficients for a model relating data of a first entity to data of a second entity.

As shown in FIG. 3A, the method 300 begins at block 310, where Alice 120 and Bob 130 agree on a common set of members to use for generating an equation $b=f(M)$ for predicting Bob's data, represented as a vector b with one datum per member, from Alice's data, represented as a matrix M with one or more datum per member. For example, Bob's data is test scores, and Alice's data is average high school grades in each of English, math, science, and history. In this example, each member from the common set has one test score and up to four average high school grades. In another example, Bob's data include salaries, and Alice's data include features of users stored by a professional networking service, such as a ranking of an educational institution, a ranking of an educational degree, a number of years of professional experience, a ranking of a quality of the professional experience, and a ranking of one or more professional skills. Each member from the common set has one salary from Bob's data and multiple features from Alice's data. In some implementations, the common set of members is the set of members associated with the common member identifiers U generated using the method 200 of FIG. 2.

In other implementations, in order to satisfy differential privacy, the set of members is derived from the common member identifiers U by determining an information item about members that is available to both Alice 120 and Bob 130 and aggregating members from the members identified by common member identifiers U using the information item. Aggregating may include computing a mean for some numeric data values. For example, if both Alice 120 and Bob 130 have access to a common definition of top students (e.g., students who were named Rhodes Scholars® or students who were admitted to Ivy League universities) those students could be combined into one super-student by averaging their numeric data (e.g., average test scores for all students, average grade for all students in English, math, science, and history). In this manner, personal identification of grades or scores of top students from the combined data (or from a publicly released version of the function $b=f(M)$) becomes impossible. In other words, the function cannot be used to exactly determine a student's test score if one know the student's grades and that he/she was a member of the dataset.

In other implementations, some noise may be added to either Alice's data or Bob's data to reduce the identifiability of individual members in the dataset. For example, for purposes of the computation, the grades, scores, salaries, or numeric representations of features from the professional networking service provided as input may be increased by a random percentage between −3% and +3%. The random percentage may have a flat distribution, a Gaussian distribution (e.g., having a mean of 0 and a standard deviation of 1%), or any other distribution.

At block 320A, Alice 120 determines the matrix M of common member data using the Alice data repository 125. For example, Alice 120 associates each member in the common set of members U with the data that is to be used in the prediction model $b=f(M)$, such as average grades in each of English, math, science, and history courses (up to four grades per member). Alice 120 stores the matrix M in the Alice data repository 125.

Similarly, at block 320B, Bob 130 determines the vector b of common member data using the Bob data repository 135. For example, Bob 130 associates each member in the common set of members U with the data that is to be used in the prediction model $b=f(M)$, such test scores (one score per member). Bob 130 stores the matrix b in the Bob data repository 135.

At block 330, the server 140 encodes a model coefficient function, F(M, b), which has an input of M and b and provides as output the coefficients (e.g., regression coefficients) of the equation $b=f(M)$, as a Boolean circuit. The Boolean circuit may be represented in software stored in memory (e.g., of the server 140). The model coefficient function, F(M, b) could be converted into a Boolean circuit representation, using a compiler. For example, in some implementations, such function can be expressed using a high level language, which is then converted to a Boolean circuit representation by a compiler that is part of the system. The server 140 provides the Boolean circuit to Alice 120. (In an alternative implementation, the server 140 provides the Boolean circuit to Bob 130, and the functions of Alice 120 and Bob 130, described below in blocks 340-370 are interchanged.) In some examples, the function F(M,b) is a regression function for a regression, such a linear regression, a quadratic regression, a cubic regression, a logarithmic regression, an exponential regression, and the like.

At block 340, Alice 120 hard codes the input of Alice's data M into the model coefficient function Boolean circuit, resulting in a Boolean circuit for $F'(b)=F(M, b)$. In some cases, this operation is performed by determining the input bits associated with Alice's data (from the high level language to compiled circuit mapping), and assigning them to true or false in the encoded Boolean circuit correspondingly based on Alice's input.

As used herein, the phrase "hard codes" encompasses its plain and ordinary meaning. In some cases, Alice 120 hard codes Alice's data by adjusting wires in a physical silicon circuit. Alternatively, the silicon circuit may be represented in software, and Alice 120 may adjust the software representation of the circuit (e.g., by adding additional representations of input wires or gates).

At block 350, Alice 120 garbles the Boolean circuit with pseudorandom keys K, for each input wire where A was inputted. Each key K represents either a 0 or a 1 input to the input wire. Alice 120 transmits to Bob 130 the garbled Boolean circuit. As used herein, the term pseudorandom encompasses its plain and ordinary meaning. In some cases, a pseudorandom value is generated using a computerized random number generator.

As shown in FIG. 3B, at block 360, Alice 120 transmits to Bob 130 the pseudorandom keys that are used. Importantly, while Bob 130 receives, from Alice 120, the pseudorandom keys that are used, Bob 130 does not receive an indication of whether each key represents 0 or 1. In this way, Bob 130 cannot use the keys to decode the private data of Alice 130 encoded in the garbled Boolean circuit.

At block 370, Bob 130 computes the coefficients of $b=f(M)$ using the keys K, provided by Alice 130, and Bob's data b as input to the garbled Boolean circuit. Bob 130 provides the computed coefficients to Alice 120 and the server 140. After block 370, the method 300 ends.

According to some aspects, the function $f(\ )$ is a linear map. In other words, $b=f(M)=X*M$, for some matrix X, In these aspects, the function $X=F(M, b)=b*M^{-1}$.

In one example, Bob's data is standardized test scores, and Alice's data is average high school grades in each of English, math, science, and history. After the coefficients of the function $b=f(M)$ are computed, the function $b=f(M)$ may be useful to students at the high school. For example, a high school student who knows his/her grades in English, math, science, and history may use the function $b=f(M)$ to estimate his/her likely score on the standardized test. This information may be useful to the student, for example, in gauging how well prepared he/she is for the test and in determining a likelihood that he/she will be admitted or rejected to a program (e.g., a college, a scholarship program, a volunteer program, or a job) based on the test scores. In another use case, a high school student who has already taken the test and knows his/her scores may use $b=f(M)$ to determine how his/her test scores compare to those of other students who have similar grades.

Some implementations of the subject technology are directed to generating a numeric relationship between features of members stored by a social networking service and salaries of members stored by a payroll provider. Using the techniques of the subject technology, a member of the professional networking service who is contemplating renegotiating his/her salary or seeking a career change may use the generated numeric relationship in order to predict how his/her salary is likely to be effected by various career moves and/or to determine how his/her salary compares with salaries of similar professionals. Furthermore, a member of the professional networking service choosing an educational institution, a field of study, or other educational or professional program can use the numeric relationship provided by the subject technology to predict what his/her salary range would be if he/she undergoes the educational or professional program.

Figure 4:
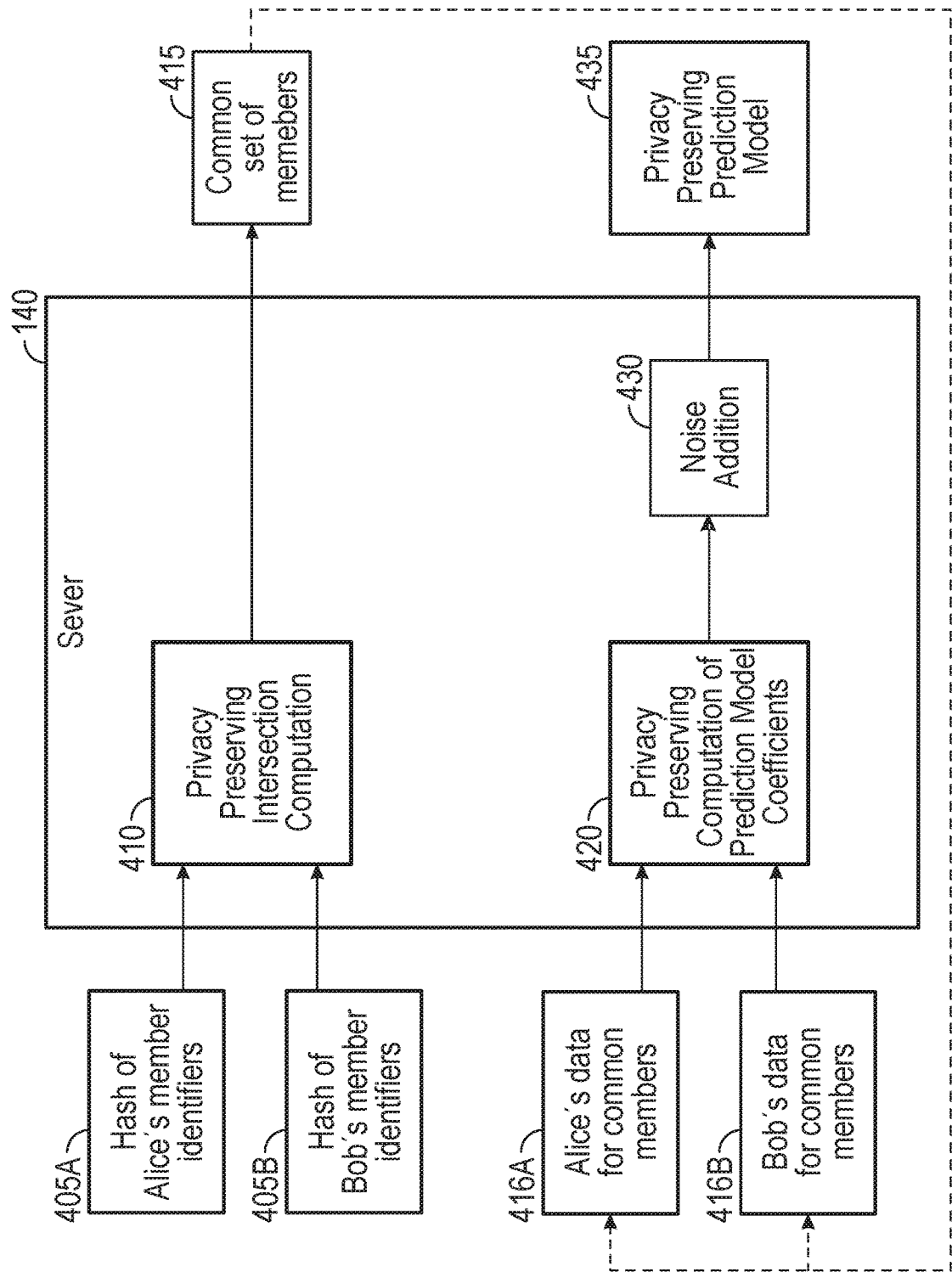
FIG. 4 is a block diagram of an example of the server of FIG. 1.

FIG. 4 is a block diagram of an example of the server 140 of FIG. 1. As shown, the server 140 includes a privacy preserving intersection computation component 410, a privacy preserving computation of prediction model coefficients component 420, and a noise addition component 430. The components 410, 420, and 430 may be implemented using software, hardware, or a combination of software or hardware. Software components may be stored in a memory, while hardware components may be hard-wired into one or more processors. (See the discussion of FIG. 6, below.)

The privacy preserving intersection computation component 410 implements the method 200 of FIG. 2. The privacy preserving intersection computation component 410 implements the block 240 and signals for Alice 120 or Bob 130 to implement the blocks 210, 220, 230, and 250. As shown, the input for the component 210 is the hash of Alice's member identifiers 405A and the hash of Bob's member identifiers 405B, provided to the server 140, as discussed in conjunction with block 230. The output of the component 410 is data which is used, by Alice 120 and Bob 130, to identify the common set of members 415 (e.g., common set of members U), as discussed in conjunction with block 250. As shown, the common set of members 415 is used, by Alice, to obtain Alice's data for the common members 416A (M), and Bob's data for the common members 416B (b).

As described above in conjunction with FIGS. 3A-3B, Alice's data for the common members 416A (M), and Bob's data for the common members 416B (b), which are generated in block 320 of FIG. 3A, are used, without being directly provided to the server in an unencrypted manner, by the privacy preserving computation of prediction model coefficients component 420. The component 420 is configured to cause the server 140 to carry out step 330, and to signal for Alice 120 and Bob 130 to carry out steps 340-370. Upon completion of execution of the component 420, coefficients for the prediction model b=$f$(A) are generated.

The noise addition component 430 is configured to add noise to the coefficients to ensure that differential privacy is met, and that no individual member's data value stored by Bob 130 (e.g., test score) can be determined by knowing the member's data values stored by Alice 120 (e.g., grades in English, math, science, and history). In some cases, the noise addition component 430 introduces an error (e.g., increase or decrease by a pseudo-randomly determined amount having a mean of zero) to the coefficients generated by the component 420. In one example, the introduced error has a Gaussian distribution with a mean of zero and a standard deviation of 1%. The noise addition component 430 is configured to add noise drawn independently from such a distribution to each of the prediction model coefficients to prevent use of the coefficients to exactly compute the data stored by Bob 130 of a specific member from the data stored by Alice 120 of the specific member. The amount of noise error to be added could be determined based on the desired level of privacy: choosing a distribution with a larger standard deviation results in greater level of privacy.

The noise addition component 430 outputs the privacy preserving prediction model 435 b=$f$(M), including the computed coefficients of the model. In some cases, the subject technology is implemented without the noise addition component 430, and the component 420 outputs the computed coefficients of the privacy preserving prediction model 435 b=$f$(M).

As used herein, the term "configured" encompasses its plain and ordinary meaning. A component may be configured to carry out an operation by storing, in software memory, instructions for processor(s) to carry out the operation. Alternatively, the component may be hard-wired into the processor(s).

Figure 5:
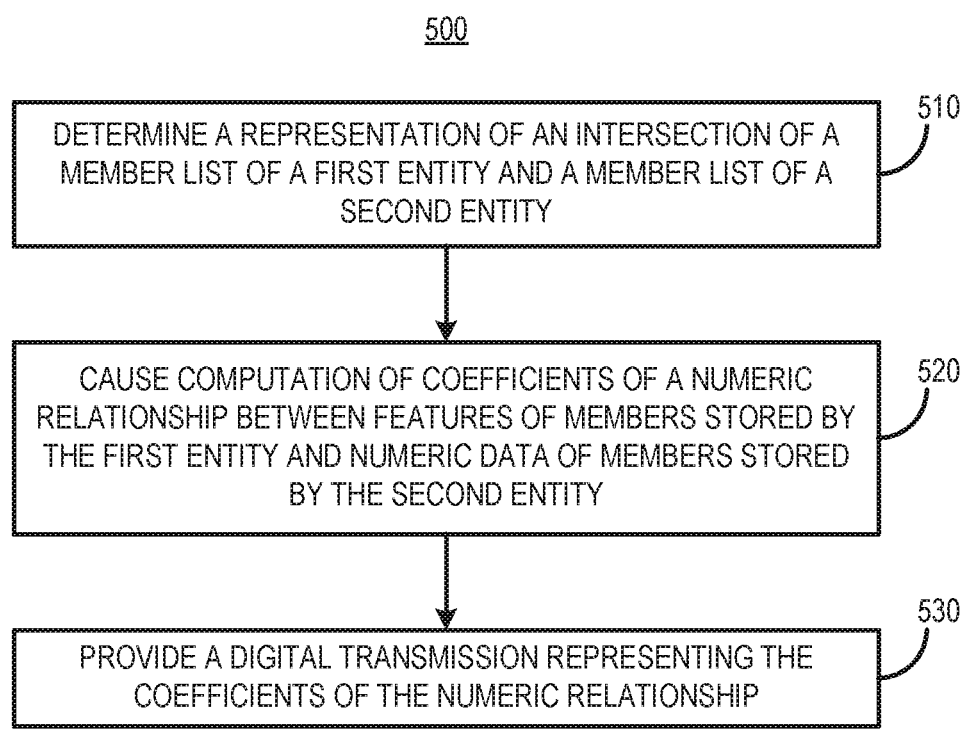
FIG. 5 is a flow chart of an example method for relating private data of different entities.

FIG. 5 is a flow chart of an example method 500 for relating private data of different entities. According to some aspects, the method 500 is implemented at the server 140.

At operation 510, the server 140 (e.g., using privacy preservation intersection computation component 410) determines an intersection of a member list of a first entity and a member list of a second entity. The server 140 does not access the member list of the first entity or the member list of the second entity, as the member lists may include private information, such as social security numbers, which the first entity and the second entity are not willing or able (e.g., due to privacy requirements of the members) to share with the server. One example of the process by which the server 140 determines the intersection is described in conjunction with FIG. 2.

As used herein, the term "list" encompasses its plain and ordinary meaning. A list may include a listing or collection of members which may be represented as a linked list, an array, a matrix, a set, and the like. Any known data structure may be used to represent the list, and the term "list" does not imply a specific data structure, unless clearly stated otherwise.

At operation 520, the server 140 (e.g., using privacy preserving computation of prediction model coefficients component 420) causes computation of coefficients of a numeric relationship between features of members stored by the first entity and numeric data of members stored by the second entity. The computation is based on information associated with the intersection of the member list of the first entity and the member list of the second entity. The server does not access the features stored by the first entity or the numeric data of the second entity, as the first entity or the second entity are not willing or able to share such data with machines that do not belong to them, for example, to protect the privacy of their members. The features and numeric data may include very private information, such as grades in an academic program or test scores on a standardize exam. One example of the process by which the server 140 causes computation of the coefficients is described in conjunction with FIGS. 3A-3B.

At operation 530, the server 140 provides a digital transmission representing the coefficients of the numeric relationship. The digital transmission is provided to the first entity, the second entity, and/or any other interested parties. In some cases, prior to providing the digital transmission representing the coefficients of the numeric relationship, the server 140 adds noise to the coefficients to prevent use of the coefficients to exactly compute the numeric data of a specific member from the features of the specific member. After operation 530, the method 500 ends.

Figure 6:
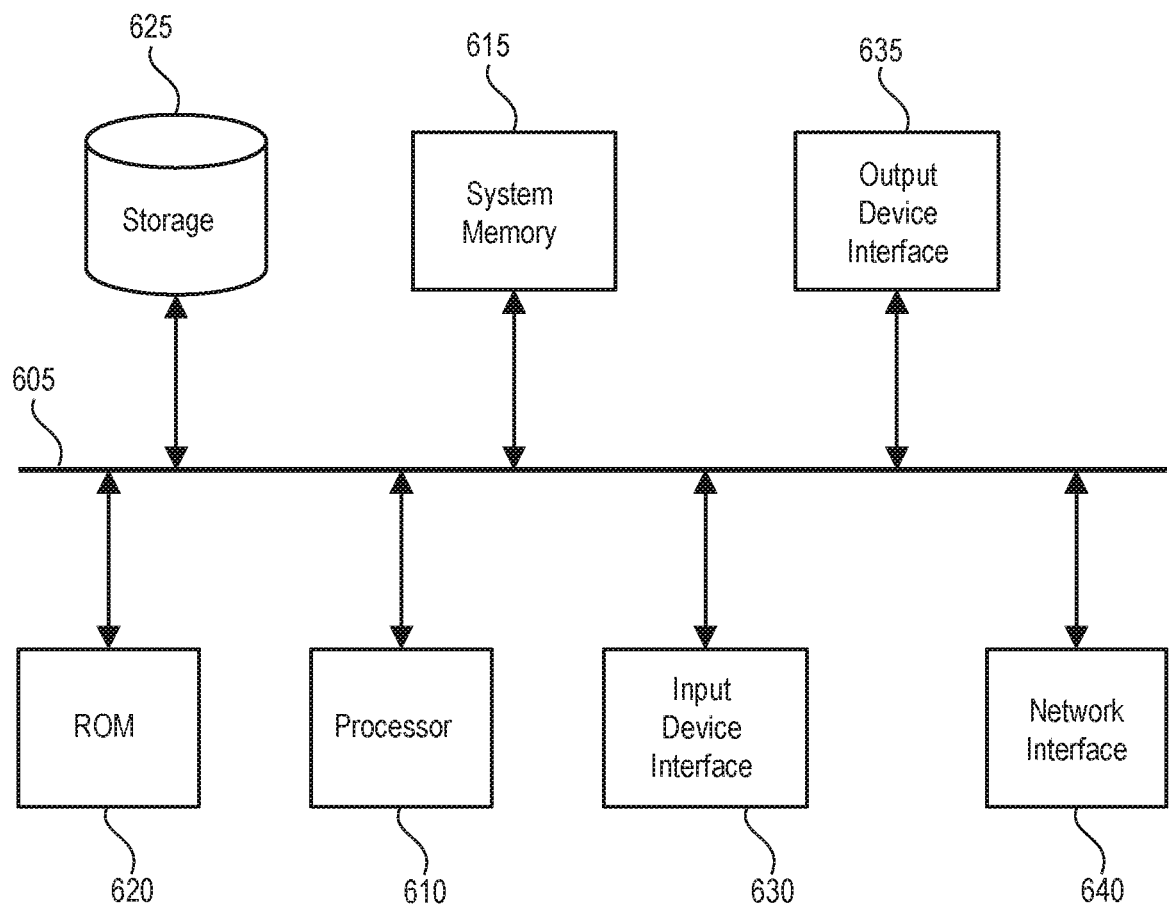
FIG. 6 conceptually illustrates an example electronic system with which some implementations of the subject technology can be implemented.

FIG. 6 conceptually illustrates an electronic system 600 with which some implementations of the subject technology are implemented. For example, one or more of the client device 110, Alice 120, Bob 130, the server 140, or the data repositories 125 and 135 may be implemented using the arrangement of the electronic system 600. The electronic system 600 can be a computer (e.g., a mobile phone, PDA), or any other sort of electronic device. Such an electronic system includes various types of computer-readable media and interfaces for various other types of computer-readable media. Electronic system 600 includes a bus 605, processor(s) 610, a system memory 615, a read-only memory (ROM) 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processor(s) 610 with the read-only memory 620, the system memory 615, and the permanent storage device 625.

From these various memory units, the processor(s) 610 retrieves instructions to execute and data to process in order to execute the processes of the subject technology. The processor(s) can include a single processor or a multi-core processor in different implementations.

The read-only-memory (ROM) 620 stores static data and instructions that are needed by the processor(s) 610 and other modules of the electronic system. The permanent storage device 625, on the other hand, is a read-and-write memory device. This device 625 is a non-volatile memory unit that stores instructions and data even when the electronic system 600 is off. Some implementations of the subject technology use a mass-storage device (for example a magnetic or optical disk and its corresponding disk drive) as the permanent storage device 625. Other implementations use a removable storage device (for example a floppy disk, flash drive, and its corresponding disk drive) as the permanent storage device 625.

Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor 610 needs at runtime. In some implementations, the processes of the subject technology are stored in the system memory 615, the permanent storage device 625, or the read-only memory 620. For example, the various memory units include instructions for relating private data of different entities in accordance with some implementations. From these various memory units, the processor(s) 610 retrieves instructions to execute and data to process in order to execute the processes of some implementations.

The bus 605 also connects to the input and output device interfaces 630 and 635. The input device interface 630 enables the user to communicate information and select commands to the electronic system 600. Input devices used with input device interface 630 include, for example, alphanumeric keyboards and pointing devices (also called "cursor control devices").

Output device interfaces 635 enable, for example, the display of images generated by the electronic system 600. Output devices used with output device interface 635 include, for example, printers and display devices, for example cathode ray tubes (CRT) or liquid crystal displays (LCD). Some implementations include devices, for example a touch screen, that function as both input and output devices.

Finally, as shown in FIG. 6, bus 605 also couples electronic system 600 to a network (not shown) through a network interface 640. In this manner, the electronic system 600 can be a part of a network of computers (for example a local area network (LAN), a wide area network (WAN), or an Intranet, or a network of networks, for example the Internet. Any or all components of electronic system 600 can be used in conjunction with the subject technology.

The above-described features and applications can be implemented as software processes that are specified as a set of instructions recorded on a computer-readable storage medium (also referred to as computer-readable medium). When these instructions are executed by one or more processor(s) (which may include, for example, one or more processors, cores of processors, or other processing units), they cause the processor(s) to perform the actions indicated in the instructions. Examples of computer-readable media include, but are not limited to, CD-ROMs, flash drives, RAM chips, hard drives, erasable programmable read-only memory (EPROM), etc. The computer-readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or, in some cases, one or more of the illustrated steps may be omitted. Some of the steps may be performed simultaneously. For example, in certain circumstances, multitasking and parallel processing may be implemented. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, "an aspect," does not imply that the aspect is essential to the subject technology or that the aspect applies to all configurations of the subject technology. A disclosure relating to an aspect may apply to all configurations, or one or more configurations. A phrase, for example, "an aspect," may refer to one or more aspects and vice versa. A phrase, for example, "a configuration," does not imply that such configuration is essential to the subject technology or that such configuration applies to all configurations of the subject technology. A disclosure relating to a configuration may apply to all configurations, or one or more configurations. A phrase, for example, "a configuration," may refer to one or more configurations and vice versa.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method performed by a server, the method comprising:
   determining an intersection of (i) a first member list of a first database of a first electronic system (FES) and (ii) a second member list of a second database of a second electronic system (SES);
   providing the determined intersection to the FES and the SES;
   receiving (i) a matrix M, from the FES and (ii) a vector, b, from the SES, M is a matrix based on the intersection, and b is a vector based on the intersection;
   generating a model coefficient function using b and M;
   generating a Boolean circuit using the model coefficient function, wherein the Boolean circuit comprises executable instructions;
   transmitting the Boolean circuit to the FES;
   receiving, from the SES, computed coefficients from the Boolean circuit, the computed coefficients including (i) coefficients from the Boolean circuit, generated, by the FES, based on M and pseudorandom keys, and then (ii) the generated coefficient further modified by the SES based on b and the pseudorandom keys; and
   providing the computed coefficients of the model coefficient function as a prediction model.

2. The method of claim 1, wherein the coefficients represent a numeric relationship between features of members in the intersection, the features comprising one or more of a ranking of an educational institution, a ranking of an educational degree, a number of years of professional experience, a ranking of a quality of the professional experience, a ranking of one or more professional skills, a current position title, a past position title, a seniority level of the current or the past position title, a current employer, a past employer, a publication or patent held by the member, or a project completed by the member.

3. The method of claim 1, wherein each of the first and second member lists comprise one or more of a last name, a first name, a company name, or an office location.

4. The method of claim 1, wherein determining the intersection of the first and second member lists comprises:
   receiving, from the FES a first list of values, the first list of values representing a first hash function of member identifiers of members of a professional networking service;
   receiving, from the SES, a second list of values, the second list of values representing the first hash function of member identifiers of a second service; and
   computing an intersection of the first list of values and the second list value.

5. The method of claim 1, wherein: the computed coefficients include M hardcoded into the Boolean Circuit.

6. The method of claim 1, further comprising:
   prior to providing the computed coefficients adding noise to the computed coefficients and wherein the provided prediction model includes the computed coefficients with added noise.

7. The method of claim 2, wherein the numeric relationship comprises a regression function.

8. The method of claim 1, wherein the first member list comprises first names, wherein the second member list of the second service comprises second names, and wherein comprises com pen sati on data.

9. A non-transitory machine-readable medium comprising instructions which, when executed by one or more processors of a server, cause the one or more processors of the server to implement operations comprising:
   determining an intersection of (i) a first member list of a first database of a first electronic system (FES) and (ii) a second member list of a second database of a second electronic system (SES);
   transmitting the determined intersection to the FES and the SES;
   receiving (i) a matrix, M, from the FES and (ii) a vector, b, from the SES, M is a matrix based on the intersection, and b is a vector based on the intersection;
   generating a model coefficient function using b and M;
   generating a Boolean circuit using the model coefficient function, wherein the Boolean circuit comprises executable instructions;

transmitting the Boolean circuit to the FES;
receiving, from the SES, computed coefficients from the Boolean circuit, the computed coefficients including (i) coefficients, from the Boolean circuit, generated, by the FES, based on M and pseudorandom keys, and then (ii) the generated coefficient further modified by the SES based on b and the pseudorandom keys; and
providing the computed coefficients for the model coefficient function as a prediction model.

10. The machine-readable medium of claim 9, wherein the coefficients represent a numeric relationship between features of members in the intersection, the features one or more of a ranking of an educational institution, a ranking of an educational degree, a number of years of professional experience, a ranking of a quality of the professional experience, a ranking of one or more professional skills, a current position title, a past position title, a seniority level of the current or the past position title, a current employer, a past employer, a publication or patent held by the member, or a project completed by the member.

11. The machine-readable medium of claim 9, wherein each of the first and second member list comprises: one or more of a last name, a first name, a company name, or an office location.

12. The machine-readable medium of claim 9, wherein determining the intersection of the first and second member lists comprises:
receiving, from the FES, a first list of values, the first list of values representing a first hash function of member identifiers of members of a professional networking service;
receiving, from the SES, a second list of values, the second list of values representing the first hash function of member identifiers of IL second service; and
computing an intersection of the first list of values and the second list of values.

13. The machine-readable medium of claim 9, wherein the computed coefficients include M hardcoded into the Boolean circuit.

14. The machine-readable medium of claim 9, the operations further comprising:
prior to providing the computed coefficients, adding noise to the computed coefficients and wherein the provided prediction model includes the computed coefficients with added noise.

15. The machine-readable medium of claim 10, wherein the numeric relationship comprises a regression function.

16. The machine-readable medium of claim 9, wherein the first member list comprises first names, wherein the member list of the payroll provider comprises second names, and wherein b comprises compensation data.

17. A server comprising:
a processor and a memory storing executable instructions that when executed by the processor perform the steps of:
determining an intersection of (i) a first member list of a first database of a first electronic system (FES) and (ii) a second member list of a second database of a second electronic system (SES);
providing the determined intersection to the FES and the SES;
receiving (i) a vector, b, from the SES and (ii) M from the FES, where b is a vector based on M;
generating a model coefficient function using b and M;
generating a Boolean circuit using the model coefficient function, wherein the Boolean circuit comprises executable instructions;
transmitting the Boolean circuit to the FES;
receiving, from the SES, computed coefficients from the Boolean circuit, the computed coefficients including (i) coefficients from the Boolean circuit, generated, by the FES, based on M and pseudorandom keys, and then (ii) the generated coefficient further modified by the SES based on b and the pseudorandom keys; and
providing the computed coefficients of the model coefficient function as a prediction model.

18. The system of claim 17, wherein determining the intersection comprises:
receiving, from the FES, a first list of values, the first list of values representing a first hash function of member identifiers of the professional networking service;
receiving, at the server and from the SES, a second list of values, the second list of values representing the first hash function of member identifiers of the second service, wherein the first hash is based on one way hash function;
computing an intersection of the first list of values and the second list of values.

* * * * *